United States Patent
Okada

(10) Patent No.: US 8,264,339 B2
(45) Date of Patent: Sep. 11, 2012

(54) ALARM MANAGEMENT APPARATUS

(75) Inventor: Satoshi Okada, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 467 days.

(21) Appl. No.: 12/322,113

(22) Filed: Jan. 29, 2009

(65) Prior Publication Data

US 2009/0201144 A1    Aug. 13, 2009

(30) Foreign Application Priority Data

Jan. 31, 2008    (JP) .................. 2008-020442

(51) Int. Cl.
G08B 29/00    (2006.01)
(52) U.S. Cl. .................. 340/506; 340/500; 340/501
(58) Field of Classification Search .................. 340/506
See application file for complete search history.

(56) References Cited

U.S. PATENT DOCUMENTS

| | | | | |
|---|---|---|---|---|
| 5,581,242 | A * | 12/1996 | Arita et al. ................ | 340/691.6 |
| 7,408,458 | B1 * | 8/2008 | Sheleheda et al. ............ | 340/506 |
| 7,692,537 | B2 * | 4/2010 | Skold et al. ................ | 340/506 |
| 2005/0062598 | A1 * | 3/2005 | Akamatsu et al. ............ | 340/506 |
| 2007/0222576 | A1 * | 9/2007 | Miller et al. ................ | 340/506 |
| 2008/0088430 | A1 * | 4/2008 | Ogiyama ................ | 340/506 |

FOREIGN PATENT DOCUMENTS

| | | |
|---|---|---|
| JP | 61-107406 A | 5/1986 |
| JP | 63-279400 A | 11/1988 |
| JP | 03-044797 A | 2/1991 |
| JP | 05-108412 A | 4/1993 |
| JP | 05-189679 A | 7/1993 |
| JP | 08-083122 A | 3/1996 |
| JP | 09-109724 A | 4/1997 |
| JP | 2000-163122 A | 6/2000 |
| JP | 2003-186536 | 7/2003 |
| WO | 2007/093756 A1 | 8/2007 |

OTHER PUBLICATIONS

M. Bray et al.; "Practical Alarm Filtering"; Intech, Engineer's Notebook, Feb. 1994, pp. 34-36, vol. 41, No. 2, XP009014395.
European Search Report dated Jul. 1, 2009, issued in corresponding European Patent Application No. 09001250.1.
J. E. Larsson et al.; "Alarm Reduction and Root Cause Analysis for Nuclear Power Plant Control Rooms"; http://www.goalart.com/en/newsandpublications/publications.asp, retrieved Jan. 1, 2005.
Japanese Office Action dated Nov. 1, 2011, issued in corressponding Japanese Patent Application No. 2008-020442.

* cited by examiner

Primary Examiner — George Bugg
Assistant Examiner — Kerri McNally
(74) Attorney, Agent, or Firm — Westerman, Hattori, Daniels & Adrian, LLP

(57) ABSTRACT

The invention relates to an alarm management apparatus for managing an alarm occurring in a plant. The alarm management apparatus includes an alarm collection unit for collecting an alarm; a process data collection unit for collecting process data; an alarm suppression determination unit for determining whether or not suppressing an alarm from an alarm suppression target is adequate using the process data upon reception of an alarm suppression command; and an alarm processing unit for suppressing the alarm from the alarm suppression target if the alarm suppression determination unit determines that the alarm suppressing is adequate.

8 Claims, 5 Drawing Sheets

ALARM MANAGEMENT APPARATUS

TECHNICAL FIELD

The present invention relates to an alarm management apparatus for managing an alarm occurring in a plant and in particular to an alarm suppression function of suppressing an unnecessary alarm message.

RELATED ART

Hitherto, a large number of alarms have occurred without interruption from a field device, a distributed control system (DCS), etc., whereby an alarm flood state in which an alarm message monitor screen becomes full of alarm messages has occurred, causing a plant operator to overlook an important alarm or make an erroneous determination. Thus, there is a demand for suppressing an alarm notification sent to the operator in response to the state and the operation situation of the plant.

Then, alarm management has been conducted in such a manner that the operator is notified only of a necessary alarm at the optimum timing by choosing information if a large number of alarms are generated.

FIG. 4 is a schematic representation of alarm suppression in a related art.

A DCS is made up of a field control station (FCS) 1 for controlling a field device (not shown), an operation monitor station (HIS) 10 for providing an operator interface to perform operation monitor of the FCS 1, and an engineering station (ENG) 20 for executing engineering functions of application edit, download, test, etc., and maintenance. The function of the HIS 10 and the function of the ENG 20 can be installed in one PC or in separate PCs.

An alarm collection section 11 receives an alarm and an event from a real device in a plant such as a field device or the FCS 1. An alarm processing section 12 adds added value information to the received alarm and event, normalizes the received alarm and event, etc.

The alarm processing section 12 determines whether or not the collected alarm is an alarm to be suppressed in accordance with an alarm suppression command from an input section 13, and sends only the alarm to be reported to the operator to an alarm display section 14. Consequently, an unnecessary alarm is suppressed and only a necessary alarm is displayed on a display 15.

A plant engineer sets processing for an alarm or an event by an alarm engineering section 22 through an input section 21 and groups alarms to be suppressed. The data set in the alarm engineering section 22 is retained in an alarm engineering DB 23 as a database (DB). The plant engineer engineers the plant while checking the descriptions on a-display 24.

Processing of the alarm processing section 12 is executed based on information in the alarm engineering DB 23.

FIG. 5 is a schematic representation of an alarm suppression condition in the related art.

The plant engineer previously groups alarms by the alarm engineering section 22. In the example, tags FIC100, FIC200, TIC100, and TIC200 are assigned to Group 1, and tags FIC300, FIC400, TIC300, and TIC400 are assigned to Group 2.

If it is necessary to suppress alarms of FIC100, FIC200, TIC100, and TIC200, the operator sends a notification that Group 1 is to be suppressed to the alarm processing section 12 using the input section 13 of the HIS 10.

[Patent document 1] Japanese Patent Laid-Open No. 2003-186536

In a state in which an alarm message is inevitably issued as at the maintenance time of a field device, there is a demand for temporarily suppressing such an unnecessary alarm to prevent overlooking of any other important alarm. However, determination as to which alarm group to suppress is left to the operator and a check mechanism for operation of the operator is not provided and thus there is a possibility that a device which must not be suppressed may be suppressed because of a mistake in the group name, an operation mistake, etc.

Determination of suppression release of an alarm message is left to the operator and an automatic suppression releasing mechanism is not provided and thus it is feared that an alarm may be overlooked because the operator forgets to release alarm suppression although it becomes unnecessary to suppress the alarm.

SUMMARY

Exemplary embodiments of the present invention provide an alarm management apparatus that can check validity of alarm suppression.

Exemplary embodiments of the present invention are embodied as follows:

(1) An alarm management apparatus for managing an alarm occurring in a plant, the alarm management apparatus having:

an alarm collection section which collects an alarm;

a process data collection section which collects process data;

an alarm suppression determination section which determines whether or not suppressing an alarm from an alarm suppression target is adequate using the process data upon reception of an alarm suppression command; and an alarm processing section which suppresses the alarm from the alarm suppression target if the alarm suppression determination section determines that the alarm suppressing is adequate.

(2) The alarm management apparatus as claimed in claim 1 further having an alarm engineering section which groups the alarm suppression targets and sets an alarm suppression condition to suppress alarms for each group.

(3) The alarm management apparatus as claimed in claim 1 or 2 wherein the process data collection section selects only the process data required for the determination of the alarm suppression determination section and collects the process data periodically.

(4) The alarm management apparatus as claimed in claim 2 or 3 further comprising:

an alarm display section which controls an alarm display, wherein upon reception of the alarm suppression command, when the group of the alarm suppression target does not satisfy the alarm suppression condition, the alarm suppression determination section does not permit the alarm processing section to execute alarm suppression and the alarm processing section notifies the alarm display section that the alarm suppression is not permitted.

(5) The alarm management apparatus as claimed in any of claims 2 to 4 wherein if the alarm suppression condition becomes unsatisfied after being satisfied, the alarm suppression determination section releases the alarm suppression of the alarm processing section.

According to the invention, the following advantages can be provided:

An operation mistake involved in the alarm suppression of the operator can be prevented, erroneous suppression of a necessary alarm can be eliminated, and safety of plant operating can be improved.

Other features and advantages may be apparent from the following detailed description, the accompanying drawings and the claims.

DETAILED DESCRIPTION

The invention will be discussed in detail with the accompanying drawings.

Figure 1:
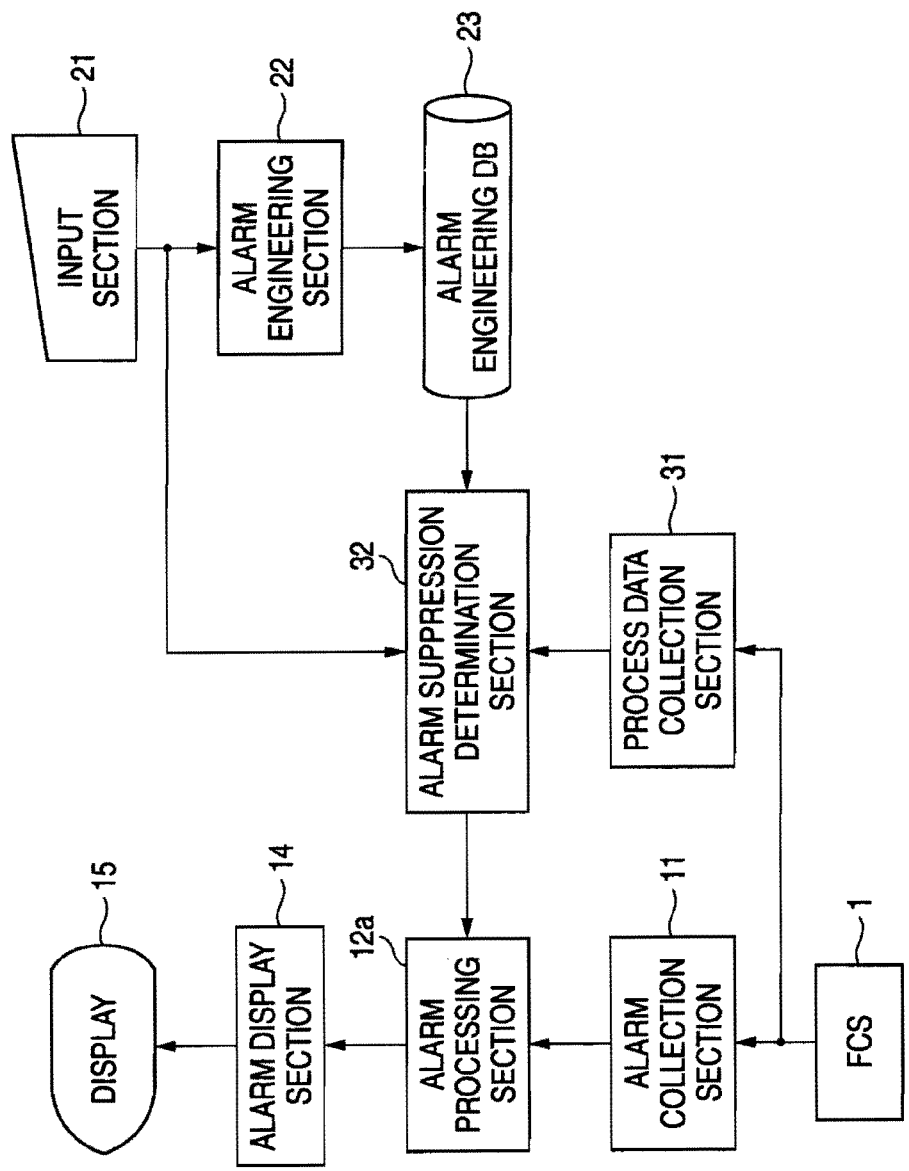
FIG. 1 is a block diagram to show one embodiment of the invention.
Figure 4:
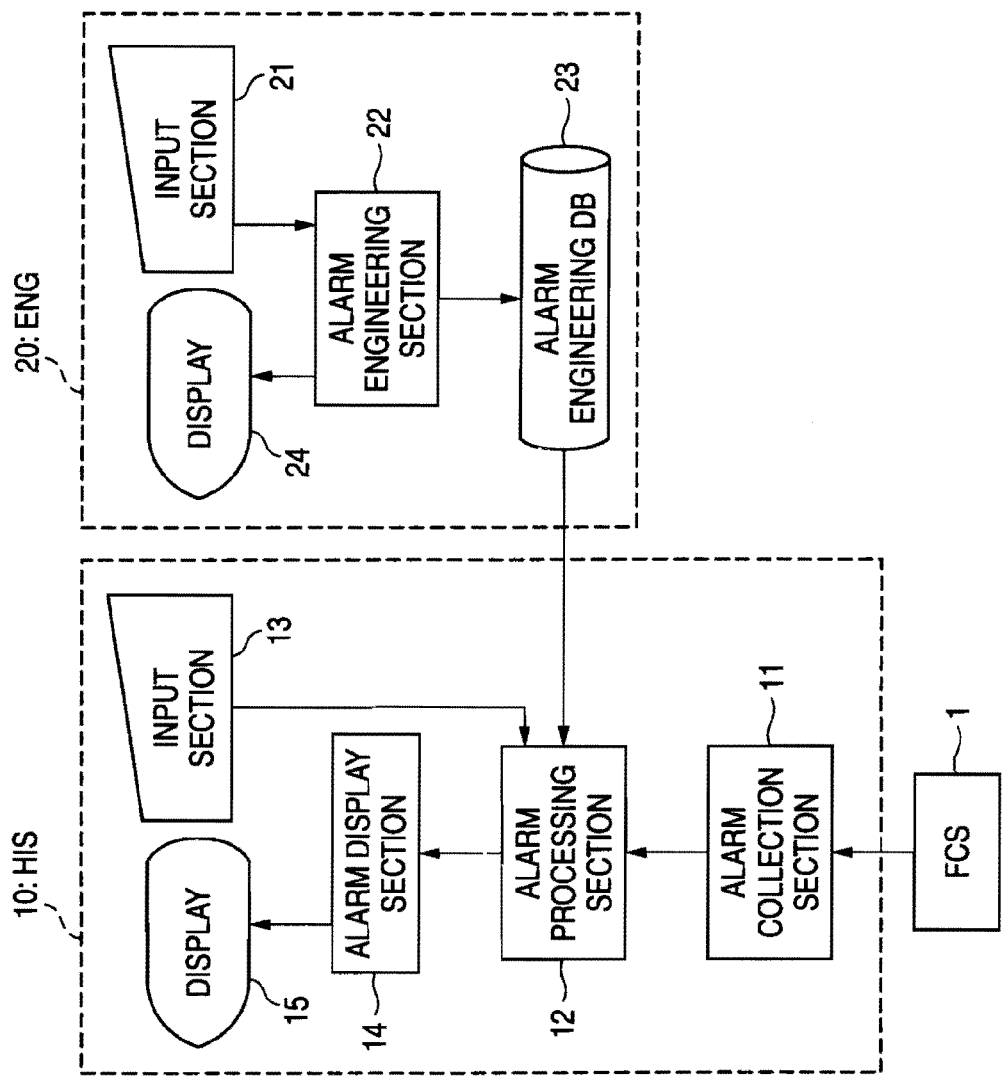
FIG. 4 is a schematic representation of alarm suppression in a related art.
Figure 5:
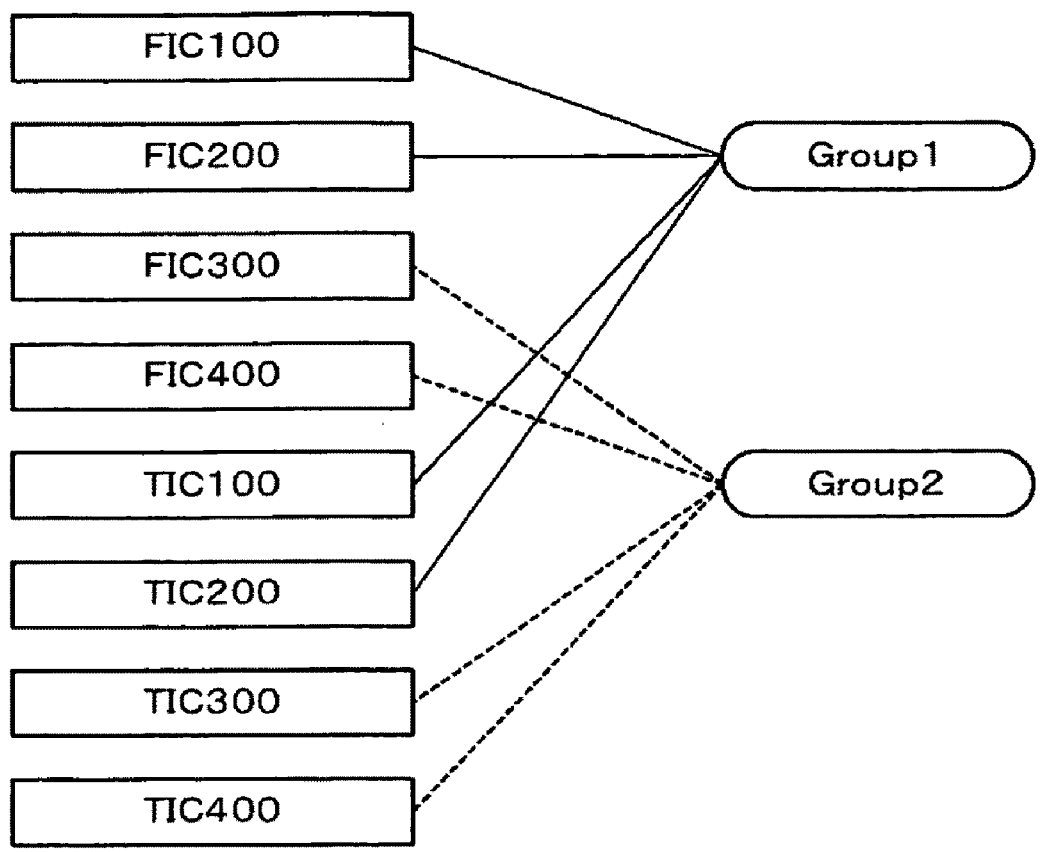
FIG. 5 is a schematic representation of an alarm suppression condition in the related art.

FIG. 1 is a block diagram to show one embodiment of the invention. Components identical with those previously described with reference to FIG. 4 are denoted by the same reference numerals in FIG. 1.

An alarm collection section 11 receives an alarm and an event from a real device in a plant such as a field device or an FCS 1. An alarm processing section 12a adds added value information to the received alarm and event, normalizes the received alarm and event, etc. Adding the added value information is a function of adding the assumed issuance cause of the alarm, the measures to be taken, information to be monitored together, etc., to the alarm or the event. The normalizing is processing of removing dialect of the collected alarm and event and level mismatch and is a function of standardizing the notation, performing level matching of alarm importance, etc.

An alarm engineering section 22 is a section for setting processing for an alarm or an event and a plant operator or a plant engineer (hereinafter simply referred to as operator) groups alarms to be suppressed through an input section 21 and specifies an alarm suppression condition to suppress each group. The alarm suppression condition is specified by describing a conditional expression using process data of the plant. The data set in the alarm engineering section 22 is retained in an alarm engineering DB 23 as a database (DB).

A process data collection section 31 periodically collects process data from the plant. At this time, all process data of the plant may be collected or the alarm suppression condition set in the alarm engineering section 22 may be analyzed and only the process data set in the alarm suppression condition (process data required for determination of an alarm suppression determination section 32) may be selected for collection.

If the operator determines that alarm suppression is required, the operator issues an alarm suppression command through the input section 21. Upon reception of the alarm suppression command, the alarm suppression determination section 32 determines whether or not suppression of the alarms in the group to be suppressed is adequate. At this time, the alarm suppression determination section 32 uses the process data collected in the process data collection section 31 to determine whether or not the alarm suppression condition set in the alarm engineering section 22 is satisfied.

If the alarm suppression determination section 32 determines that suppression of the alarms in the group to be suppressed is adequate, the alarm suppression determination section 32 permits the alarm processing section 12a to suppress the alarms in the group. In this case, the alarm processing section 12a identifies and suppresses the alarms in the group corresponding to the alarm suppression command issued by the operator among the alarms collected in the alarm collection section 11, and passes data concerning the alarms to an alarm display section 14. Consequently, the unnecessary alarms in the group specified by the operator are suppressed and only necessary alarms are displayed on a display 15.

On the other hand, if the alarm suppression determination section 32 determines that suppression of the alarms in the group to be suppressed is not adequate, the alarm suppression determination section 32 does not permit the alarm processing section 12a to suppress the alarms in the group. In this case, the alarm processing section 12a notifies the alarm display section 14 that the alarm suppression commanded by the operator is not permitted. Consequently, a message to the effect that the alarm suppression is not permitted is displayed on the display 15, enabling the operator to recognize that the alarm suppression commanded by the operator is not permitted.

Accordingly, for the determination of the operator for the situation of the plant, the process data from the real plant is collected and is used to check whether or not suppression of the alarms in the group to be suppressed is adequate, whereby an operation mistake involved in the alarm suppression of the operator can be prevented, erroneous suppression of a necessary alarm can be eliminated, and safety of plant operating can be improved.

If alarm suppression is started, the alarm suppression determination section 32 uses the process data periodically collected by the process data collection section 31 to periodically check whether or not the alarm suppression condition is satisfied. If the alarm suppression condition set is not satisfied, the alarm suppression determination section 32 commands the alarm processing section 12a to release the alarm suppression.

Accordingly, overlooking an alarm because the operator forgets to release alarm suppression although it becomes unnecessary to suppress the alarm can be prevented.

Figure 2:
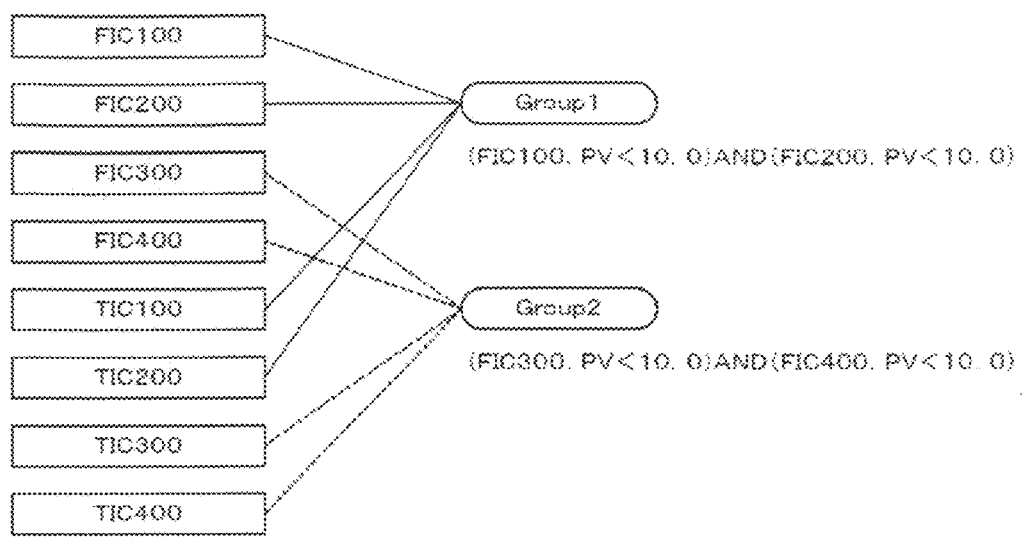
FIG. 2 is a schematic representation of an alarm suppression condition of the invention.

FIG. 2 is a schematic representation of the alarm suppression condition of the invention.

The alarms to be suppressed are grouped and a condition to suppress each group is specified by the alarm engineering section 22.

The alarms are grouped considering relevant events as in facility units, step units, etc., conforming to the situation of the plant. In the example, tags FIC100, FIC200, TIC100, and TIC200 are assigned to Group 1, and tags FIC300, FIC400, TIC300, and TIC400 are assigned to Group 2. FIC100, TIC100, etc., represents the name (tag) assigned to a field device installed in the plant.

The group suppression condition is set for each group. In the example, the group suppression condition is described with the process data for the tag name of a field device and a logical operation expression. Specifically, the alarm suppression condition of Group 1 will be discussed.

(FIC100, PV<10.0) AND (FIC200, PV<10.0) indicates that if PV (measurement value) of each of the field devices FIC100 and FIC200 for measuring the flow quantity of the plant becomes smaller than 10.0% of the whole flow quantity, alarms from the devices belonging to Group 1 are suppressed.

Such a setting is possible if unnecessary alarms are to be temporarily suppressed collectively (as a group), etc., in a state in which an alarm is inevitably issued containing the field devices associated with a specific value as the specific value is closed for maintenance.

If it is necessary to suppress alarms of FIC100, FIC200, TIC100, and TIC200, the operator uses the input section 21 to notify the alarm suppression determination section 32 that Group 1 is to be suppressed. The alarm suppression determination section 32 reads the alarm suppression condition of Group 1 from the alarm engineering DB 23 and uses the process data collected in the process data collection section 31 to determine whether or not the alarm suppression condition of Group 1 is satisfied.

Thus, automatic checking is performed for the determination of the operator based on the actual process data, so that suppressing an alarm which must not be suppressed because of a mistake in the group name, an operation mistake, etc., of the operator is eliminated.

As in the example, the alarm suppression condition is set as a logical operation expression according to the process data of a plurality of field devices (FIC100 and FIC200), whereby the validity of the alarm suppression can be precisely determined as compared with determination based on the process data of only one field device. Field machines involving an alarm issued one after another (for example, TIC100 and TIC200) need only to be assigned to the relevant group (Group 1) and the conditional expression for the tag name becomes unnecessary.

The alarm suppression determination section 32 collates the process data and the alarm suppression condition with each other in a fixed cycle. Thus, for example, if the measurement value of the field device FIC100 exceeds 10.0% of the whole flow quantity, the alarm suppression is released. Accordingly, operator triggers starting of alarm suppression, but alarm suppression can be released automatically, a burden of operation, determination, etc., on the operator can be lightened, the operator can be prevented from forgetting to release alarm suppression, and overlooking of an important alarm can be eliminated.

Figure 3:
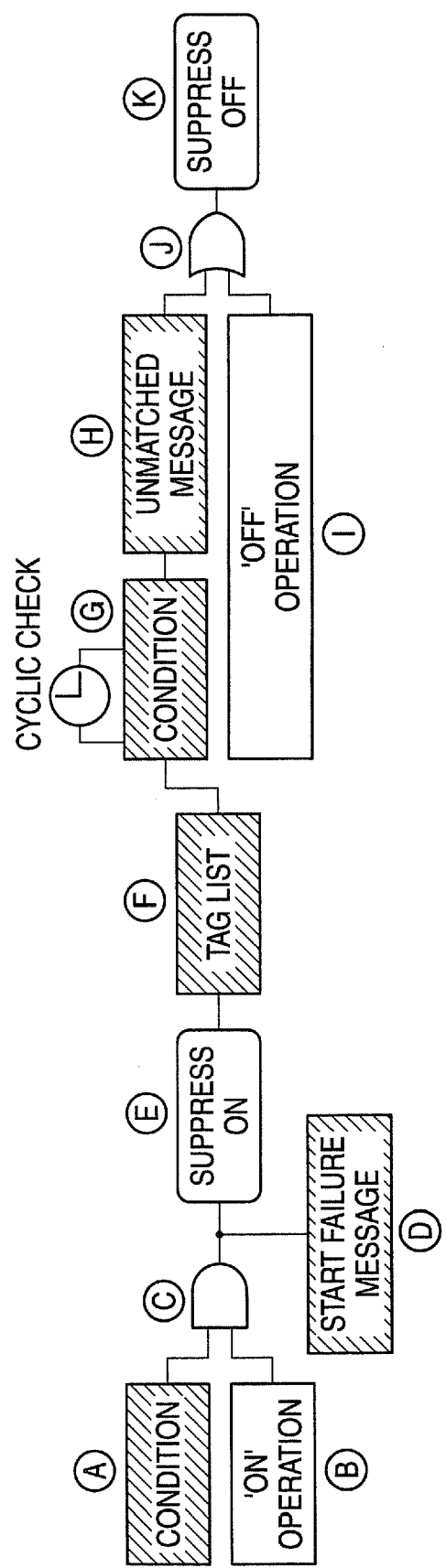
FIG. 3 is a specific block diagram of the invention.

FIG. 3 is a specific block diagram of the invention.

An alarm suppression condition (A) is previously set for each group of alarms to be suppressed and when the operator specifies the group of alarms to be suppressed and issues an alarm suppression command (B), whether or not suppressing the alarms in the group specified by the operator is adequate, namely, whether or not the alarm suppression condition of the group is satisfied is determined for the alarm suppression command of the specific group issued by the operator (C).

If the alarm suppression condition is not satisfied, the operator is notified that the alarm suppression of the group is not executed (D). On the other hand, if the alarm suppression condition is satisfied, the alarm suppression of the group is executed (E). At this time, the tag names of the field devices whose alarm is to be suppressed are listed, enabling the operator to check them (F).

If the alarm suppression condition is satisfied and the alarm suppression is started, whether or not the alarm suppression condition is satisfied is checked on a predetermined period (G). The checking interval can be defined by the operator.

If the alarm suppression condition is not satisfied, the operator is notified that the alarm suppression condition is not satisfied (H). If the alarm suppression condition is not satisfied (H, J) or if the operator issues an alarm suppression release command (I, J), the alarm suppression of the group is released (K).

Although occurrence of an alarm flood state can be prevented by suppressing alarms, it is feared that an alarm may be overlooked because of an erroneous alarm suppression command or that an alarm may be overlooked because the operator forgets to release alarm suppression.

According to the invention, the alarm suppression command is automatically checked for validity and when it becomes unnecessary to suppress alarms, automatically the alarm suppression is released, so that a burden of operation, determination, etc., on the operator can be lightened and appropriate alarm management can be conducted.

What is claimed is:

1. An alarm management apparatus for managing an alarm occurring in a plant, said alarm management apparatus comprising:
 a computer configured to operate as
  an alarm collection section which collects an alarm;
  an alarm engineering section via which an operator sets an alarm suppression condition that is used to determine whether an alarm is to be suppressed;
  an input section via which an operator inputs an alarm suppression command specifying that an alarm from at least one alarm suppression target is to be suppressed;
  a process data collection section which collects process data;
  an alarm suppression determination section which determines, in response to reception of the alarm suppression command, whether or not the process data collected by the process data collection section satisfies the alarm suppression condition; and
  an alarm processing section which suppresses the alarm from the at least one alarm suppression target,
  wherein the alarm suppression determination section permits the alarm processing section to suppress the alarm specified by the alarm suppression command input by the operator in response to determining that the process data collected by the process data collection section satisfies the alarm suppression condition, and
  the alarm suppression determination section does not permit the alarm processing section to suppress the alarm specified by the alarm suppression command input by the operator in response to determining that the process data collected by the process data collection section does not satisfy the alarm suppression condition.

2. The alarm management apparatus as claimed in claim 1, wherein the alarm engineering section groups the at least one alarm suppression target and sets an alarm suppression condition to suppress alarms for each group.

3. The alarm management apparatus as claimed in claim 1 wherein said process data collection section selects only the process data required for the determination of said alarm suppression determination section and collects the process data periodically.

4. The alarm management apparatus as claimed in claim 2 further comprising:
 an alarm display section which controls an alarm display,
 wherein upon reception of the alarm suppression command, when the group of the at least one alarm suppression target does not satisfy the alarm suppression condition, said alarm suppression determination section does not permit said alarm processing section to execute alarm suppression and said alarm processing section notifies the alarm display section that the alarm suppression is not permitted.

5. The alarm management apparatus as claimed in claim 3 further comprising:

an alarm display section which controls an alarm display, wherein upon reception of the alarm suppression command, when the group of the at least one alarm suppression target does not satisfy the alarm suppression condition, said alarm suppression determination section does not permit said alarm processing section to execute alarm suppression and said alarm processing section notifies the alarm display section that the alarm suppression is not permitted.

6. The alarm management apparatus as claimed in claim 2, wherein said alarm suppression determination section periodically determines whether or not the process data collected by the process data collection section satisfies the alarm suppression condition, and if, during the periodical determination, said alarm suppression determination section determines that the alarm suppression condition becomes unsatisfied after being satisfied, said alarm suppression determination section automatically releases the alarm suppression of said alarm processing section.

7. The alarm management apparatus as claimed in claim 3, wherein said alarm suppression determination section periodically determines whether or not the process data collected by the process data collection section satisfies the alarm suppression condition, and if, during the periodical determination, said alarm suppression determination section determines that the alarm suppression condition becomes unsatisfied after being satisfied, said alarm suppression determination section automatically releases the alarm suppression of said alarm processing section.

8. The alarm management apparatus as claimed in claim 1, wherein said alarm suppression determination section periodically determines whether or not the process data collected by the process data collection section satisfies the alarm suppression condition, and if, during the periodical determination, said alarm suppression determination section determines that the alarm suppression condition becomes unsatisfied after being satisfied, said alarm suppression determination section automatically releases the alarm suppression of said alarm processing section.

* * * * *